(12) United States Patent
Glass et al.

(10) Patent No.: US 6,187,484 B1
(45) Date of Patent: Feb. 13, 2001

(54) IRRADIATION MASK

(75) Inventors: Thomas R. Glass, Idaho City; Kevin H. Schofield, Boise, both of ID (US)

(73) Assignee: Micron Technology, Inc., Boise, ID (US)

( * ) Notice: Under 35 U.S.C. 154(b), the term of this patent shall be extended for 0 days.

(21) Appl. No.: 09/387,132

(22) Filed: Aug. 31, 1999

(51) Int. Cl.⁷ ...................................... G03F 9/00
(52) U.S. Cl. .................................. 430/5; 428/426
(58) Field of Search ................... 430/5, 322; 428/426

(56) References Cited

U.S. PATENT DOCUMENTS

| | | |
|---|---|---|
| 4,923,772 | 5/1990 | Kirch et al. . |
| 5,254,202 | 10/1993 | Kaplan . |
| 5,501,925 | 3/1996 | Smith et al. . |
| 5,573,875 | 11/1996 | Kaplan et al. . |
| 5,780,161 * | 7/1998 | Hsu .......................................... 430/5 |
| 6,027,815 * | 2/2000 | Hsu .......................................... 430/5 |

* cited by examiner

*Primary Examiner*—S. Rosasco
(74) *Attorney, Agent, or Firm*—Killworth, Gottman, Hagan & Schaeff, L.L.P.

(57) ABSTRACT

A laser ablation mask, a method of mask production, and an process of workpiece irradiation are provided. In accordance with one embodiment of the present invention, a method of producing a radiation reflective mask is provided comprising the steps of: (i) providing a substrate, wherein the substrate is transparent to radiation of a selected range of wavelengths; (ii) forming a metallic layer over an upper surface of the substrate, wherein the metallic layer is reflective of the selected wavelengths of radiation; (iii) forming at least one pair of dielectric layers over an upper surface of the metallic layer, wherein the pair of dielectric layers are arranged to reflect incident radiation at the selected wavelengths; and (iv) patterning the metallic layer and the pair of dielectric layers to form apertures therein, wherein the apertures render portions of the mask transparent to the selected wavelengths of radiation.

23 Claims, 2 Drawing Sheets

IRRADIATION MASK

CROSS-REFERENCE TO RELATED APPLICATIONS

BACKGROUND OF THE INVENTION

The present invention relates to irradiation of a workpiece through a patterned mask and, more particularly, to a laser ablation mask, its method of production, and its manner of use. Although the present invention is described in the context of laser ablation, it is contemplated by the present invention that the irradiation mask of the present invention is suitable for use in irradiation applications outside of the realm of laser ablation.

As will be appreciated by those of ordinary skill in the art, laser ablation has application in many diverse fields. Typically, laser ablation processes must be done at relatively high laser power and high accuracy with high throughput and a high degree of repeatability. Laser ablation masks have been employed to enhance the accuracy and repeatability of the process. The mask incorporates apertures that are transparent to the wavelength of the radiation output by the laser and is used to produce a similar pattern of apertures on each of a plurality of successive workpieces. However, high laser power and throughput typically have adverse effects on many laser ablation masks.

Typical laser power levels often exceed 1 watt/cm$^2$. In ordinary metal masks fabricated from chromium, power levels above 1 watt/cm$^2$ cause separation of the metal from the underlying glass or quartz substrate because a substantial amount of laser energy is absorbed by the metal layer, even though a high percentage of the incident laser radiation is reflected. As a result, the metal of the mask itself, and not just the material of the workpiece, may be ablated by the laser. Accordingly, the useful life of a particular laser projection mask formed of metal is very limited at high power levels.

Due to the inability of metal masks to withstand the laser ablation process at desired laser power flux levels, masks composed of alternating dielectric films of silicon oxide and tantalum oxide of closely controlled thickness and differing refractive indices have been proposed and used in some applications. If the thicknesses of the layers are closely controlled with respect to the wavelength of the laser radiation and the respective refractive indices of the materials, a destructive interference pattern can be established to reflect a majority of the light incident on each dielectric layer pair. Desirable thicknesses and materials for these layers are on the order of 500 Angstroms for silicon oxide and 400 Angstroms for tantalum oxide. The transmitted radiation flux can be reduced to any arbitrary desired degree by increasing the number of dielectric layer pairs which are stacked together to form the mask. However, dielectric masks are difficult to manufacture and the materials proposed for use in the plurality of dielectric layer pairs are very difficult to pattern in order to form a mask. Accordingly, multi-layered dielectric masks have not yet provided a solution to the trade-off between mask cost and laser throughput requirements in laser ablation. As a result, there is a continuing need for an irradiation mask resists laser ablation and that represents a simplified and cost effective mask manufacturing process.

BRIEF SUMMARY OF THE INVENTION

This need is met by the present invention wherein an improved laser ablation mask, an improved method of mask production, and an improved process of workpiece irradiation are provided.

In accordance with one embodiment of the present invention, a method of producing a radiation reflective mask is provided comprising the steps of: (i) providing a substrate, wherein the substrate is transparent to radiation of a selected range of wavelengths; (ii) forming a metallic layer over an upper surface of the substrate, wherein the metallic layer is reflective of the selected wavelengths of radiation; (iii) forming at least one pair of dielectric layers over an upper surface of the metallic layer, wherein the pair of dielectric layers are arranged to reflect incident radiation at the selected wavelengths; and (iv) patterning the metallic layer and the pair of dielectric layers to form apertures therein, wherein the apertures render portions of the mask transparent to the selected wavelengths of radiation.

The metallic layer may be formed on the substrate. The dielectric layers may be formed on the metallic layer. The pair of dielectric layers are preferably arranged to establish a destructive interference pattern with respect to incident radiation at the selected wavelengths. The metallic layer is preferably patterned subsequent to its formation over the substrate. The dielectric layers are preferably patterned subsequent to their formation over the metallic layer.

In accordance with another embodiment of the present invention, a method of producing a radiation reflective mask is provided comprising the steps of: (i) providing a quartz substrate, wherein the substrate is transparent to laser radiation of a selected wavelength; (ii) forming an aluminum layer over an upper surface of the substrate, wherein the aluminum layer is reflective of the selected wavelength of laser radiation; (iii) forming a pair of dielectric layers over an upper surface of the metallic layer, wherein the pair of dielectric layers are arranged to establish a destructive interference pattern with respect to incident laser radiation at the selected wavelength, and wherein the pair of dielectric layers include a low index of refraction silicon dioxide layer formed over the upper surface of the metallic layer and a high index of refraction silicon nitride layer formed over the silicon dioxide layer; and (iv) patterning the pair of dielectric layers and the aluminum metallic layer to form a series of apertures in the mask, wherein each of the apertures extend through the pair of dielectric layers and the aluminum metallic layer, and wherein the apertures render portions of the mask transparent to the selected wavelength of laser radiation. The pair of dielectric layers may form an uppermost surface of the mask.

In accordance with yet another embodiment of the present invention, a method of producing a laser ablation mask is provided comprising the steps of: (i) providing a quartz substrate, wherein the substrate is transparent to laser radiation of a selected wavelength; (ii) forming an aluminum layer on an upper surface of the substrate, wherein the aluminum layer is reflective of the laser radiation, and wherein the aluminum layer is less than about 3 microns in thickness; (iii) forming a pair of dielectric layers on an upper surface of the aluminum layer to define an uppermost surface of the mask, wherein the pair of dielectric layers are arranged to establish a destructive interference pattern with respect to incident laser radiation at the selected wavelength, wherein the pair of dielectric layers include a low index of refraction silicon dioxide layer formed on the upper surface of the aluminum layer and a high index of refraction silicon nitride layer formed on the silicon dioxide layer, and wherein the thickness of the silicon dioxide layer is about 40 nm and the thickness of the silicon nitride layer is about 45 nm; (iv) forming a resist layer on the pair of dielectric layers;

(v) patterning the resist layer to form a series of apertures therein; (vi) etching the pair of dielectric layers and the aluminum layer through the series of apertures in the resist layer to form a series of apertures in the mask, wherein each of the apertures extend through the pair of dielectric layers, and the aluminum layer, and wherein the apertures render portions of the mask transparent to the laser radiation; and (vii) removing the patterned resist layer.

In accordance with yet another embodiment of the present invention, a radiation reflective mask is provided comprising a substrate, a patterned metallic layer, and at least one pair of patterned dielectric layers. The substrate is transparent to radiation of a selected range of wavelengths. The patterned metallic layer is formed over an upper surface of the substrate and includes land portions that are reflective of incident radiation at the selected wavelengths and aperture portions that are transparent to incident radiation at the selected wavelengths. The pair of patterned dielectric layers are formed over an upper surface of the metallic layer. The pair of dielectric layers include land portions that are reflective of incident radiation at the selected wavelengths and aperture portions that are transparent to incident radiation at the selected wavelengths. The aperture portions of the pair of dielectric layers lie in at least partial registration with the aperture portions of the metallic layer.

The patterned metallic layer may be formed on the substrate. The dielectric layers may be formed on the upper surface of the metallic layer. The pair of dielectric layers are preferably arranged to establish a destructive interference pattern with respect to incident radiation at the selected wavelengths.

In accordance with yet another embodiment of the present invention, a radiation reflective mask is provided comprising a quartz substrate, a patterned aluminum layer, and a pair of patterned dielectric layers.

The substrate is transparent to laser radiation of a selected wavelength. The patterned aluminum layer is formed over an upper surface of the substrate and includes land portions that are reflective of incident laser radiation at the selected wavelength and aperture portions that are transparent to incident laser radiation at the selected wavelength. The patterned dielectric layers are formed over an upper surface of the patterned aluminum layer and also include land portions that are arranged to establish a destructive interference pattern with respect to the incident laser radiation and aperture portions that are transparent to the incident laser radiation. The pair of dielectric layers include a low index of refraction silicon dioxide layer formed over the upper surface of the patterned aluminum layer and a high index of refraction silicon nitride layer formed over the silicon dioxide layer. The aperture portions of the pair of dielectric layers lie in at least partial registration with the aperture portions of the patterned aluminum layer.

In accordance with yet another embodiment of the present invention, a method of selectively irradiating a workpiece is provided comprising the steps of: (i) providing a workpiece; (ii) providing a source of radiation and directing radiation from the source in the direction of the workpiece; and (iii) positioning a radiation reflective mask between the source and the workpiece in the path of the radiation to define an incident radiation side of the mask and an output radiation side of the mask. The mask comprises a substrate, a patterned metallic layer, and at least one pair of dielectric layers. The substrate defines an incident radiation surface and an output radiation surface and is transparent to the incident radiation. The patterned metallic layer defines an incident radiation surface and an output radiation surface and is formed over the incident radiation surface of the substrate. The patterned metallic layer includes land portions that are reflective of the incident radiation and aperture portions that are transparent to the incident radiation. The pair of dielectric layers are formed over the incident radiation surface of the patterned metallic layer and also include land portions that are reflective of incident radiation at the selected wavelengths and aperture portions that are transparent to incident radiation at the selected wavelengths. The aperture portions of the pair of dielectric layers lie in at least partial registration with the aperture portions of the metallic layer.

In accordance with yet another embodiment of the present invention, a method of selectively ablating a workpiece with a laser beam is provided comprising the steps of: (i) providing a workpiece; (ii) providing a laser source and directing laser radiation from the laser source in the direction of the workpiece, wherein the laser radiation is characterized by an intensity sufficient to ablate the workpiece; and (iii) positioning a radiation reflective mask between the source and the workpiece in the path of the laser radiation to define an incident radiation side of the mask and an output radiation side of the mask. The mask comprises a quartz substrate, a patterned aluminum layer, and a pair of dielectric layers. The quartz substrate defines an incident radiation surface and an output radiation surface and is transparent to the incident laser radiation. The patterned aluminum layer defines an incident radiation surface and an output radiation surface and is formed on the incident radiation surface of the quartz substrate. The patterned aluminum layer includes land portions that are reflective of the incident laser radiation and aperture portions that are transparent to the incident laser radiation. The pair of dielectric layers are formed on the incident radiation surface of the patterned aluminum layer and include land portions that are reflective of incident laser radiation at the selected wavelengths and aperture portions that are transparent to incident laser radiation at the selected wavelengths. The pair of dielectric layers include a low index of refraction silicon dioxide layer formed on the upper surface of the patterned aluminum layer and a high index of refraction silicon nitride layer formed on the silicon dioxide layer. The aperture portions of the pair of dielectric layers lie in at least partial registration with the aperture portions of the patterned aluminum layer.

Accordingly, it is an object of the present invention to provide an improved laser ablation mask, an improved method of mask production, and an improved process of workpiece irradiation. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
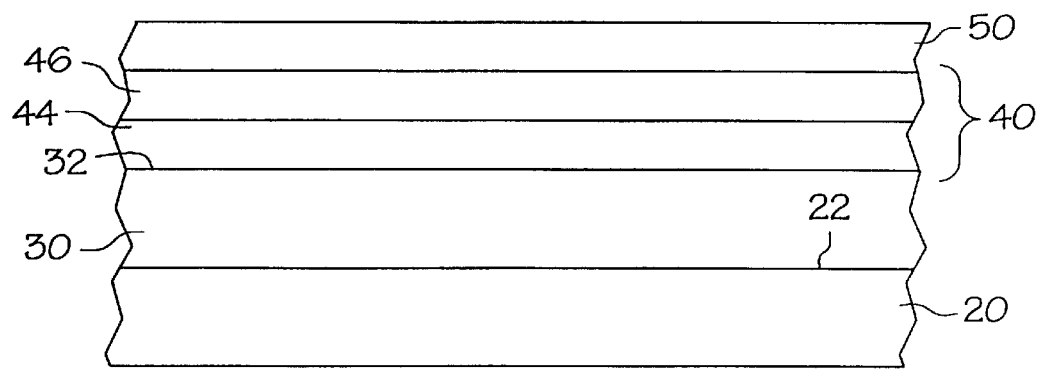
FIGS. 1–3 are schematic illustrations of a method of producing a radiation reflective mask according to the present invention.
Figure 2:
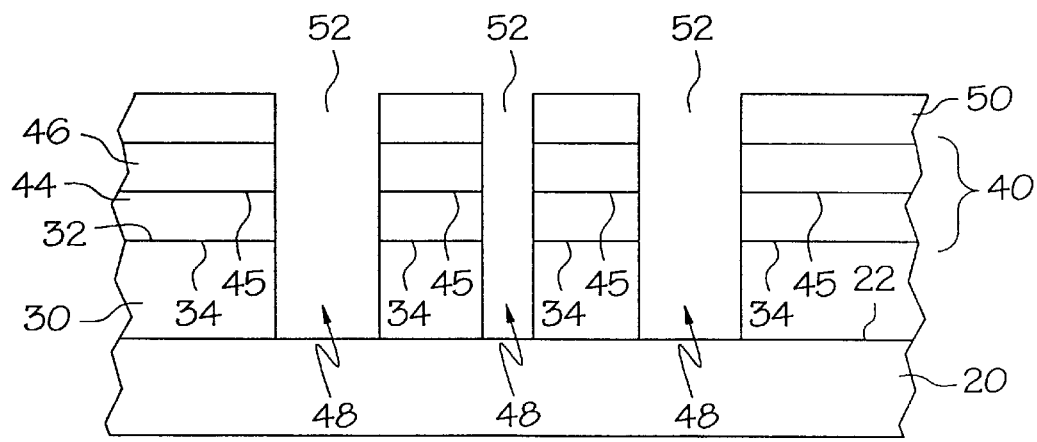
Figure 3:
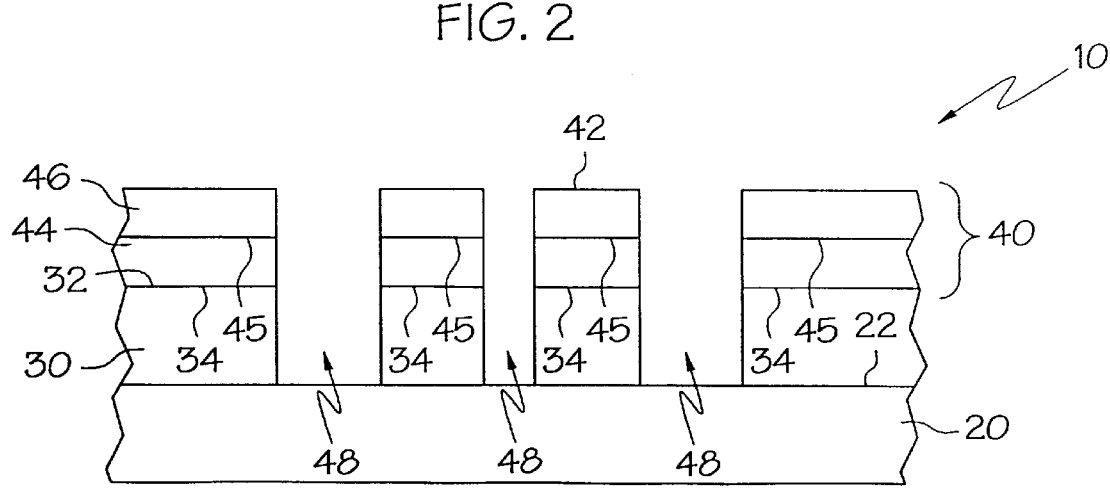
Figure 4:
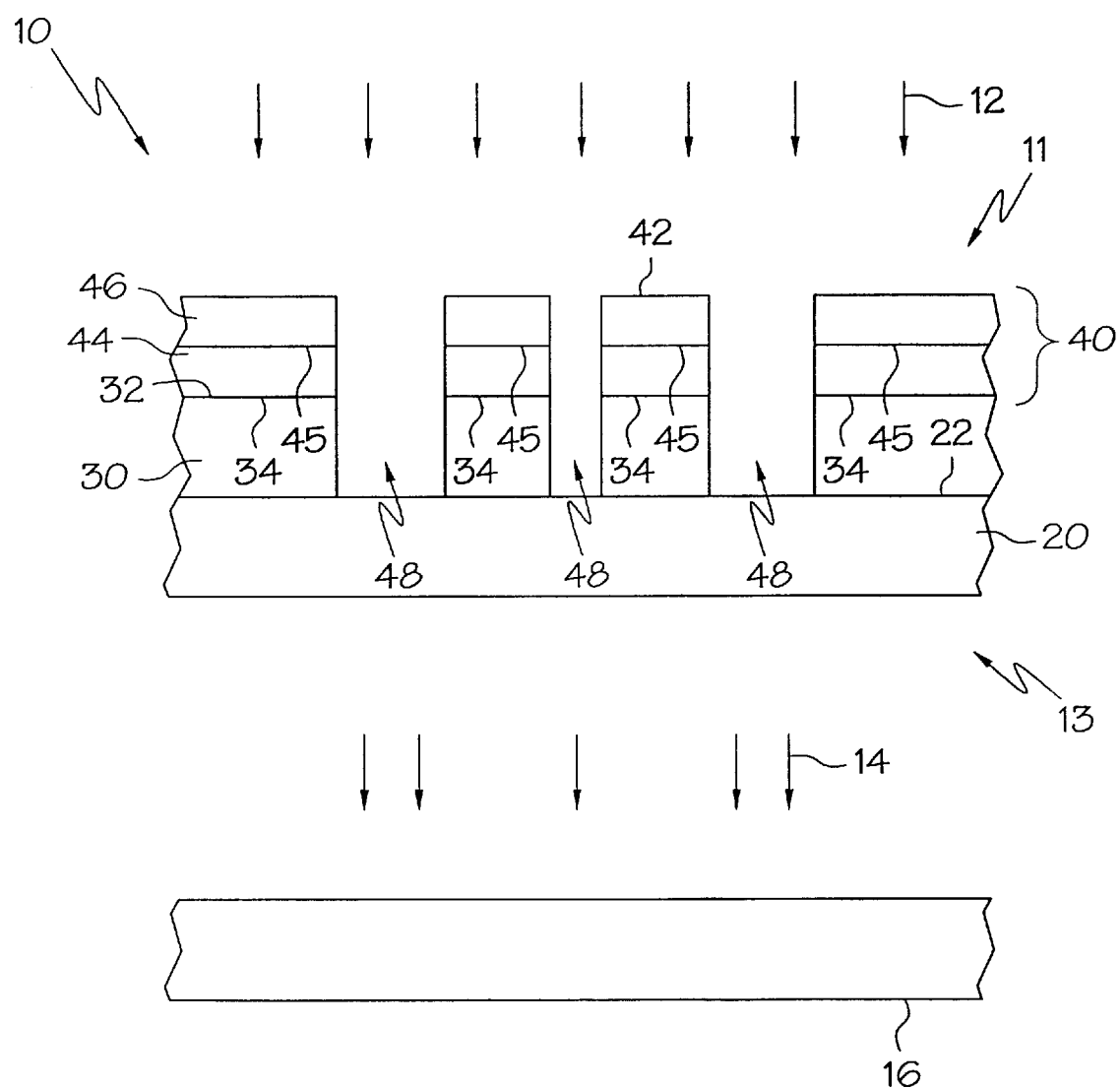
FIG. 4 is a schematic illustration of a radiation reflective mask and a method of selectively irradiating a workpiece according to the present invention.

A method of producing a laser ablation mask 10 is described herein with primary reference to FIGS. 1–3 and with secondary reference to the functional characteristics illustrated in FIG. 4. A quartz substrate 20 is provided and is selected such that it is transparent to incident or input laser radiation 12 of a particular wavelength of interest. Typically, an excimer laser operating in the wavelength range of about 193 nm to about 1050 nm is utilized in laser ablation. An aluminum layer 30 is formed on an upper surface 22 of the substrate 20. The aluminum layer 30 is selected such that it is reflective of the incident laser radiation 12 and may have a thickness from about 1 microns to about 5 microns and, preferably, less than about 3 microns. A pair of dielectric layers 40 are formed on an upper surface 32 of the aluminum layer 30 to define what will become an uppermost surface 42 of the mask 10.

The pair of dielectric layers 40 are arranged to reflect the incident laser radiation 12 by establishing a destructive interference pattern at the wavelength of interest. Specifically, the pair of dielectric layers 40 include a low index of refraction silicon dioxide layer 44 formed over the upper surface 32 of the aluminum layer 30 and a high index of refraction silicon nitride layer 46 formed over the silicon dioxide layer 44. For laser radiation of about 248 nm, the thickness of the silicon dioxide layer 44 should be about 40 nm and the thickness of the silicon nitride layer 46 should be about 45 nm. By controlling the thicknesses of the dielectric layers 40 with respect to the wavelengths of radiation in this manner, a destructive interference pattern can be established to reflect a majority of the incident laser radiation 12.

To illustrate the advantages of the present invention, it is noted that an aluminum-only mask will reflect approximately 93% of the incident laser radiation 12 at a given wavelength. As is noted above, the energy of the remaining 7% of the incident laser radiation absorbed by the aluminum layer is typically enough to ablate the aluminum layer. According to one embodiment of the present invention the quantity of the energy absorbed by the aluminum layer is reduced by almost 50% because the mask 10 with the dielectric layers 40 and the aluminum layer 30 reflects about 96% of the incident laser radiation 12.

As will be appreciated by those practicing the present invention, the mask 10 must include transparent portions as well as reflective portions. To form the transparent portions in the mask 10, a resist layer 50 is formed on the pair of dielectric layers 40. The resist layer 50 is patterned using any of a number of conventional patterning schemes to form a series of apertures 52 therein. Subsequently, the pair of dielectric layers 40 and the aluminum layer 30 are patterned through the series of apertures 52 in the resist layer 50—also according to any of a number of conventional patterning schemes. In this manner, a series of apertures 48 are formed in the mask 10. The patterned resist layer is typically removed after formation of the apertures 48. Each of the apertures 48 extend through the pair of dielectric layers 40 and the aluminum layer 30 and render portions of the mask 10 transparent to the incident laser radiation 12. As a result, patterned output laser radiation 14 may be directed to the workpiece 16.

Referring now specifically to FIGS. 3 and 4, the radiation reflective mask 10 according to the present invention comprises a quartz substrate 20, a patterned aluminum layer 30, and a pair of dielectric layers 40. The substrate 20 is transparent to laser radiation of the selected wavelength and may comprise suitable transparent materials other than quartz. The patterned aluminum layer 30 is formed on an upper surface 22 of the substrate 20 and includes land portions 34 that are reflective of incident laser radiation at the selected wavelength and aperture portions 48 that are transparent to incident laser radiation at the selected wavelength. It is contemplated by the present invention that alternative metals, e.g., chromium, may be selected to form the patterned metallic layer 30.

The pair of patterned dielectric layers 40 are formed on an upper surface 32 of the patterned aluminum layer 30 and include land portions 45 that are arranged to establish a destructive interference pattern with respect to the incident laser radiation 12 and aperture portions 48 that are transparent to the incident laser radiation 12. Preferably the pair of dielectric layers include a low index of refraction silicon dioxide layer 44 formed over the upper surface 32 of the patterned aluminum layer 30 and a high index of refraction silicon nitride layer 46 formed over the silicon dioxide layer 44. It is contemplated by the present invention that additional suitable dielectric materials may be utilized. For example, the high index material may alternatively be hafnium oxide, scandium oxide, aluminum oxide, or thallium fluoride and the low index material may alternatively be magnesium fluoride.

To ensure mask transparency through the aperture portions 48, the portions of the apertures 48 within the pair of dielectric layers 40 lie in at least partial registration with the portions of the apertures 48 in the patterned aluminum layer 30. The pair of dielectric layers 40 typically form an uppermost surface 42 of the mask 10. However, it is contemplated by the present invention that further dielectric layers or a protective finish layer may be applied to the dielectric layers 40 to form an uppermost surface of the mask 10.

Referring further to FIG. 4, a method of selectively ablating a workpiece 16 with a laser beam is described in detail. A laser source, typically a scanning laser beam, is controlled to direct laser radiation 12 in the direction of the workpiece 16. The laser source is selected such that the incident radiation 12 has an intensity sufficient to ablate the workpiece 16. The radiation reflective mask 10 of the present invention is positioned between the laser source and the workpiece 16 in the path of the incident laser radiation 12. As a result, an incident radiation side 11 of the mask 10 and an output radiation side 13 of the mask 10 are defined. The incident laser radiation 12 passes through the mask 10 and the output laser radiation 14 is directed to the workpiece 16 and ablates the workpiece in a pattern corresponding to the apertures 48 defined in the mask 10.

Having described the invention in detail and by reference to preferred embodiments thereof, it will be apparent that modifications and variations are possible without departing from the scope of the invention defined in the appended claims. For the purpose of defining the present invention, it is noted that a layer or material formed "on" a substrate or other type of layer refers to formation in contact with a surface of the substrate. A layer or material formed "over" a substrate or other type of layer refers to formation on a surface of the substrate or above a surface of the substrate. In the case of formation of the material "over" the substrate or other type of layer, it is contemplated that other materials or layers may be between the formed layer and the substrate.

What is claimed is:

1. A method of producing a radiation reflective mask comprising the steps of:

providing a substrate, wherein said substrate is transparent to radiation of a selected range of wavelengths;

forming a metallic layer over an upper surface of said substrate, wherein said metallic layer is reflective of said selected wavelengths of radiation;

forming at least one pair of dielectric layers over an upper surface of said metallic layer, wherein said pair of dielectric layers are arranged to reflect incident radiation at said selected wavelengths;

patterning said metallic layer to form apertures therein, wherein said apertures render portions of said mask transparent to said selected wavelengths of radiation; and patterning said dielectric layers to form apertures therein, wherein said apertures render portions of said mask transparent to said selected wavelengths of radiation.

2. A method of producing a radiation reflective mask as claimed in claim 1 wherein said metallic layer is formed on said substrate.

3. A method of producing a radiation reflective mask as claimed in claim 1 wherein said dielectric layers are formed on said metallic layer.

4. A method of producing a radiation reflective mask as claimed in claim 1 wherein said pair of dielectric layers are arranged to establish a destructive interference pattern with respect to incident radiation at said selected wavelengths.

5. A method of producing a radiation reflective mask as claimed in claim 1 wherein said metallic layer is patterned subsequent to its formation over said substrate.

6. A method of producing a radiation reflective mask as claimed in claim 1 wherein said dielectric layers are patterned subsequent to their formation over said metallic layer.

7. A method of producing a radiation reflective mask comprising the steps of:

providing a quartz substrate, wherein said substrate is transparent to laser radiation of a selected wavelength;

forming an aluminum layer over an upper surface of said substrate, wherein said aluminum layer is reflective of said selected wavelength of laser radiation;

forming a pair of dielectric layers over an upper surface of said metallic layer, wherein said pair of dielectric layers are arranged to establish a destructive interference pattern with respect to incident laser radiation at said selected wavelength, wherein said pair of dielectric layers include a low index of refraction silicon dioxide layer formed over said upper surface of said metallic layer and a high index of refraction silicon nitride layer formed over said silicon dioxide layer; and patterning said pair of dielectric layers and said aluminum metallic layer to form a series of apertures in said mask, wherein each of said apertures extend through said pair of dielectric layers and said aluminum metallic layer, and wherein said apertures render portions of said mask transparent to said selected wavelength of laser radiation.

8. A method of producing a radiation reflective mask as claimed in claim 7 wherein said pair of dielectric layers form an uppermost surface of said mask.

9. A method of producing a laser ablation mask comprising the steps of:

providing a quartz substrate, wherein said substrate is transparent to laser radiation of a selected wavelength;

forming an aluminum layer on an upper surface of said substrate, wherein said aluminum layer is reflective of said laser radiation, and wherein said aluminum layer is less than about 3 microns in thickness;

forming a pair of dielectric layers on an upper surface of said aluminum layer to define an uppermost surface of said mask, wherein said pair of dielectric layers are arranged to establish a destructive interference pattern with respect to incident laser radiation at said selected wavelength, wherein said pair of dielectric layers include a low index of refraction silicon dioxide layer formed on said upper surface of said aluminum layer and a high index of refraction silicon nitride layer formed on said silicon dioxide layer, and wherein the thickness of said silicon dioxide layer is about 40 nm and the thickness of said silicon nitride layer is about 45 nm;

forming a resist layer on said pair of dielectric layers;

patterning said resist layer to form a series of apertures therein;

etching said pair of dielectric layers and said aluminum layer through said series of apertures in said resist layer to form a series of apertures in said mask, wherein each of said apertures extend through said pair of dielectric layers, and said aluminum layer, and wherein said apertures render portions of said mask transparent to said laser radiation; and removing said patterned resist layer.

10. A radiation reflective mask comprising:

a substrate, wherein said substrate is transparent to radiation of a selected range of wavelengths;

a patterned metallic layer formed over an upper surface of said substrate, wherein said patterned metallic layer includes land portions that are reflective of incident radiation at said selected wavelengths and aperture portions that are transparent to incident radiation at said selected wavelengths; and at least one pair of patterned dielectric layers formed over an upper surface of said metallic layer, wherein said pair of dielectric layers include land portions that are reflective of incident radiation at said selected wavelengths and aperture portions that are transparent to incident radiation at said selected wavelengths, and wherein said aperture portions of said pair of dielectric layers lie in at least partial registration with said aperture portions of said metallic layer.

11. A radiation reflective mask as claimed in claim 10 wherein said patterned metallic layer is formed on said substrate.

12. A radiation reflective mask as claimed in claim 10 wherein said dielectric layers are formed on said upper surface of said metallic layer.

13. A radiation reflective mask as claimed in claim 10 wherein said pair of dielectric layers are arranged to establish a destructive interference pattern with respect to incident radiation at said selected wavelengths.

14. A radiation reflective mask comprising:

a quartz substrate, wherein said substrate is transparent to laser radiation of a selected wavelength;

a patterned aluminum layer formed over an upper surface of said substrate, wherein said patterned aluminum layer includes land portions that are reflective of incident laser radiation at said selected wavelength and aperture portions that are transparent to incident laser radiation at said selected wavelength; and a pair of patterned dielectric layers formed over an upper surface of said patterned aluminum layer, wherein said pair of dielectric layers include land portions that are arranged to establish a destructive interference pattern with respect to said incident laser radiation and aperture portions that are transparent to said incident laser radiation, wherein said pair of dielectric layers include a low index of refraction silicon dioxide layer formed over said upper surface of said patterned aluminum layer and a high index of refraction silicon nitride layer formed over said silicon dioxide layer, and wherein said aperture portions of said pair of dielectric layers lie in at least partial registration with said aperture portions of said patterned aluminum layer.

15. A radiation reflective mask as claimed in claim 14 wherein said pair of dielectric layers form an uppermost surface of said mask.

16. A method of selectively irradiating a workpiece comprising the steps of:

providing a workpiece;

providing a source of radiation and directing radiation from said source in the direction of said workpiece; and positioning a radiation reflective mask between said source and said workpiece in the path of said radiation to define an incident radiation side of said mask and an output radiation side of said mask, wherein said mask comprises a substrate defining an incident radiation surface and an output radiation surface, wherein said substrate is transparent to said incident radiation, a patterned metallic layer defining an incident radiation surface and an output radiation surface and formed over said incident radiation surface of said substrate, wherein said patterned metallic layer includes land portions that are reflective of said incident radiation and aperture portions that are transparent to said incident radiation, and at least one pair of dielectric layers formed over said incident radiation surface of said patterned metallic layer, wherein said pair of dielectric layers include land portions that are reflective of incident radiation at said selected wavelengths and aperture portions that are transparent to incident radiation at said selected wavelengths, and wherein said aperture portions of said pair of dielectric layers lie in at least partial registration with said aperture portions of said metallic layer.

17. A method of selectively irradiating a workpiece as claimed in claim 16 wherein said metallic layer is formed on said substrate.

18. A method of selectively irradiating a workpiece as claimed in claim 16 wherein said dielectric layers are formed on said metallic layer.

19. A method of selectively irradiating a workpiece as claimed in claim 16 wherein said pair of dielectric layers are arranged to establish a destructive interference pattern with respect to incident radiation at said selected wavelengths.

20. A method of selectively irradiating a workpiece as claimed in claim 16 wherein said metallic layer is patterned subsequent to its formation over said substrate.

21. A method of selectively irradiating a workpiece as claimed in claim 16 wherein said dielectric layers are patterned subsequent to their formation over said metallic layer.

22. A method of selectively irradiating a workpiece as claimed in claim 16 wherein said source of radiation comprises a laser.

23. A method of selectively ablating a workpiece with a laser beam comprising the steps of:

providing a workpiece;

providing a laser source and directing laser radiation from said laser source in the direction of said workpiece, wherein said laser radiation is characterized by an intensity sufficient to ablate said workpiece; and positioning a radiation reflective mask between said source and said workpiece in the path of said laser radiation to define an incident radiation side of said mask and an output radiation side of said mask, wherein said mask comprises a quartz substrate defining an incident radiation surface and an output radiation surface, wherein said quartz substrate is transparent to said incident laser radiation, a patterned aluminum layer defining an incident radiation surface and an output radiation surface and formed on said incident radiation surface of said quartz substrate, wherein said patterned aluminum layer includes land portions that are reflective of said incident laser radiation and aperture portions that are transparent to said incident laser radiation, and a pair of dielectric layers formed on said incident radiation surface of said patterned aluminum layer, wherein said pair of dielectric layers include land portions that are reflective of incident laser radiation at said selected wavelengths and aperture portions that are transparent to incident laser radiation at said selected wavelengths, wherein said pair of dielectric layers include a low index of refraction silicon dioxide layer formed on said upper surface of said patterned aluminum layer and a high index of refraction silicon nitride layer formed on said silicon dioxide layer, and wherein said aperture portions of said pair of dielectric layers lie in at least partial registration with said aperture portions of said patterned aluminum layer.

* * * * *